(12) United States Patent
Woo (10) Patent No.: US 9,219,267 B2
(45) Date of Patent: Dec. 22, 2015

(54) SECONDARY BATTERY

(75) Inventor: Seok-Gyun Woo, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 518 days.

(21) Appl. No.: 13/593,213

(22) Filed: Aug. 23, 2012

(65) Prior Publication Data

US 2013/0252053 A1 Sep. 26, 2013

(30) Foreign Application Priority Data

Mar. 20, 2012 (KR) .................. 10-2012-0028396

(51) Int. Cl.
| | |
|---|---|
| *H01M 2/26* | (2006.01) |
| *H01M 4/70* | (2006.01) |
| *H01M 10/04* | (2006.01) |
| *H01M 4/64* | (2006.01) |
| *H01M 10/02* | (2006.01) |
| *H01M 2/02* | (2006.01) |
| *H01M 6/46* | (2006.01) |

(52) U.S. Cl.
CPC ............ *H01M 2/26* (2013.01); *H01M 4/70* (2013.01); *H01M 10/0431* (2013.01); *H01M 2/021* (2013.01); *H01M 2/263* (2013.01); *H01M 2/266* (2013.01); *H01M 4/64* (2013.01); *H01M 6/46* (2013.01); *H01M 10/02* (2013.01)

(58) Field of Classification Search
None
See application file for complete search history.

(56) References Cited

U.S. PATENT DOCUMENTS

| | | |
|---|---|---|
| 2006/0024572 A1 | 2/2006 | Lee |
| 2006/0063068 A1 | 3/2006 | Cheon et al. |
| 2007/0092791 A1 | 4/2007 | Hayashi et al. |
| 2010/0233521 A1* | 9/2010 | Byun et al. ............... 429/72 |
| 2011/0200865 A1 | 8/2011 | Byun et al. |

FOREIGN PATENT DOCUMENTS

| | | |
|---|---|---|
| JP | 2012-004099 | 1/2012 |
| KR | 2006-0022357 A | 3/2006 |
| KR | 2006-0026602 A | 3/2006 |
| KR | 2010-0102542 A | 9/2010 |
| KR | 2011-0095108 A | 8/2011 |

* cited by examiner

*Primary Examiner* — Miriam Stagg
*Assistant Examiner* — Carmen Lyles-Irving
(74) *Attorney, Agent, or Firm* — Knobbe Martens Olson & Bear LLP (57) ABSTRACT

A secondary battery including: an electrode assembly including a first electrode plate that includes an uncoated portion, a second electrode plate that includes an uncoated portion, and a separator that is interposed therebetween, wherein the first and second electrode plates and the separator are wound so that the uncoated portion of the first electrode plate and the uncoated portion of the second electrode plate are arranged in different directions; a groove formed in at least one of the uncoated portions of the first and second electrode plates; and a current collector including a lead tab that is bent passing the groove in such a way that a portion of the lead tab contacts a side surface of at least one first uncoated portions and another portion of the lead tab contacts another side surface of the at least one uncoated portion.

23 Claims, 10 Drawing Sheets

SECONDARY BATTERY

RELATED APPLICATIONS

This application claims the benefit of Korean Patent Application No. 10-2012-0028396, filed on Mar. 20, 2012, in the Korean Intellectual Property Office, the disclosure of which is incorporated herein in its entirety by reference.

BACKGROUND

1. Field

One or more embodiments of the present invention relate to a secondary battery.

2. Description of the Related Art

Typically, secondary batteries are rechargeable, unlike primary batteries. Secondary batteries may be used in units of either a single battery, or a battery module formed by connecting and binding a plurality of batteries into one unit and then attached to an external device.

Secondary batteries are used as a power source for small electric devices, such as mobile phones or notebook computers. Also, they are further used in large-scale transport vehicles, such as hybrid vehicles. Accordingly, demand for high-output and high-capacity batteries is substantially increasing. To sufficiently supply electric power to an electronic device or a transport vehicle, secondary batteries need to have a stable structure.

SUMMARY

One or more embodiments of the present invention include the structure of a secondary battery.

Additional aspects will be set forth in part in the description which follows and, in part, will be apparent from the description, or may be learned by practice of the presented embodiments.

According to one or more embodiments of the present invention, a secondary battery includes: an electrode assembly including a first electrode plate that includes an uncoated portion formed along an end of the first electrode plate, a second electrode plate that includes an uncoated portion formed along an end of the second electrode plate, and a separator that is interposed between the first electrode plate and the second electrode plate, wherein the first and second electrode plates and the separator are wound so that the uncoated portion of the first electrode plate and the uncoated portion of the second electrode plate are arranged in opposite directions; a groove formed in at least one of the uncoated portions of the first and second electrode plates, wherein the at least one of the uncoated portions is a first uncoated portion; and a current collector including a lead tab that is bent passing the groove so that a first portion of the lead tab contacts a first side surface of the first uncoated portion and a second portion of the lead tab contacts a second side surface of the first uncoated portion.

The groove of the first uncoated portion may extend from the side surface of the first uncoated portion which contacts the lead tab to the second surface of the first uncoated portion which contacts the lead tab.

The electrode assembly may have an elliptic-cylindrical shape having a flat surface and a curved surface, and the side surface and the second side surface of the first uncoated portion are located on the flat surface, and the groove is substantially perpendicular to the first side surface and the second side surface of the first uncoated portion.

The first portion of the lead tab and the other portion of the lead tab may contact the first side surface of the first uncoated portion by welding.

The lead tab may be bent between the first side surface of the first uncoated portion and the groove and may further be bent between the second side surface of the first uncoated portion and the groove.

The lead tab may be bent substantially perpendicular to the first side surface of the first uncoated portion which contacts the lead tab.

According to one or more embodiments of the present invention a secondary battery may include: a first electrode plate that includes a first active material portion on which a first active material is coated and a first uncoated portion formed on a side of the first active material portion, and that is wound about an axis extending across the first active material portion and the first uncoated portion; and a first current collector that is electrically connected to the first uncoated portion, wherein the first uncoated portion has a groove, and the first current collector includes a first lead tab that is connected to the first uncoated portion, and the first lead tab is bent passing through the groove in such a way that a first portion of the first lead tab contacts a first side surface of the first uncoated portion and a second portion of the first lead tab contacts a second side surface of the first uncoated portion.

The groove may extend from the side surface of the first uncoated portion to the second side surface of the first uncoated portion.

A depth of the groove may be equal to or smaller than a width of the uncoated portion.

A thickness of the groove may be substantially equal to a thickness of the first lead tab.

The first electrode plate may be wound to be in an elliptic-cylindrical form having a flat surface and a curved surface.

The side surface and the other side surface of the first uncoated portion may be located on the flat surface.

The groove may extend from the first side surface of the first uncoated portion to the second side surface of the first uncoated portion.

The secondary battery may further include: a second electrode plate including a second active material portion on which a second active material is coated and a second uncoated portion formed on a side of the second active material portion, and that is wound about the axis, and a second current collector that is electrically connected to the second electrode plate and includes a second lead tab, wherein the second uncoated portion is disposed in a direction opposite to where the first uncoated portion is located.

According to one or more embodiments of the present invention, a secondary battery includes: a first electrode assembly including a positive electrode plate that includes an uncoated portion formed along an end of the positive electrode plate, a negative electrode plate that includes an uncoated portion formed along an end of the negative electrode plate, and a separator that is interposed between the positive electrode plate and the negative electrode plate, wherein the positive and negative electrode plates and the separator are wound in such a way that the uncoated portion of the positive electrode plate and the uncoated portion of the negative electrode plate are arranged in opposite directions; a can for housing the first electrode assembly; a cap plate for covering an opening of the can; and a first current collector including a first lead tab that is electrically connected to the first electrode assembly, wherein the at least one of the uncoated portion of the positive electrode plate and the uncoated portion of the negative electrode plate is a first uncoated portion, has a groove, and the first lead tab is bent passing through the groove in such a way that a first portion of the first lead tab contacts a first side surface of the first uncoated portion and a second portion of the first lead tab contacts a second side surface of the first uncoated portion.

The groove may extend from the first side surface of the first uncoated portion to the second side surface of the first uncoated portion, in a direction substantially perpendicular to the side surface and the other side surface of the first uncoated portion.

A depth of the groove may be equal to or greater than a width of the first lead tab.

A depth of the groove may be equal to or smaller than a width of the first uncoated portion.

The first lead tab may be bent between the first side surface of the first uncoated portion and the groove and is further bent between the second side surface of the first uncoated portion and the groove.

The secondary battery may further include: a second electrode assembly including a positive electrode plate that includes an uncoated portion formed along an end of the positive electrode plate, a negative electrode plate that includes an uncoated portion formed along an end of the negative electrode plate, and a separator that is interposed between the positive electrode plate and the negative electrode plate, wherein the positive and negative electrode plates and the separator are wound in such a way that the uncoated portion of the positive electrode plate and the uncoated portion of the negative electrode plate are arranged in opposite directions, wherein the first current collector further includes a second lead tab that is electrically connected to the second electrode assembly.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. The merits and characteristics of the present invention, and methods for accomplishing them may be obvious in view of embodiments described in detail with reference to the attached drawings. However, the present invention is not limited to the following embodiments, and may have different forms and should not be construed as being limited to the descriptions set forth herein. While this invention has been particularly shown and described with reference to embodiments thereof, it will be understood by those of ordinary skill in the art that various changes in form and details may be made therein without departing from the spirit and scope of the invention as defined by the appended claims. The terminology used herein is for the purpose of describing particular embodiments only and is not intended to be limiting of example embodiments. As used herein, the singular forms "a," "an," and "the" are intended to include the plural forms as well, unless the context clearly indicates otherwise. It will be further understood that the terms "comprises" and/or "comprising," when used in this specification, specify the presence of stated elements, steps, operations, and/or devices, but do not preclude the presence or addition of one or more other elements, steps, operations, and/or devices. It will also be understood that, although the terms first, second, etc. may be used herein to describe various elements, these elements should not be limited by these terms. These terms are only used to distinguish one element from another.

Expressions such as "at least one of," when preceding a list of elements, modify the entire list of elements and do not modify the individual elements of the list.

Figure 1:
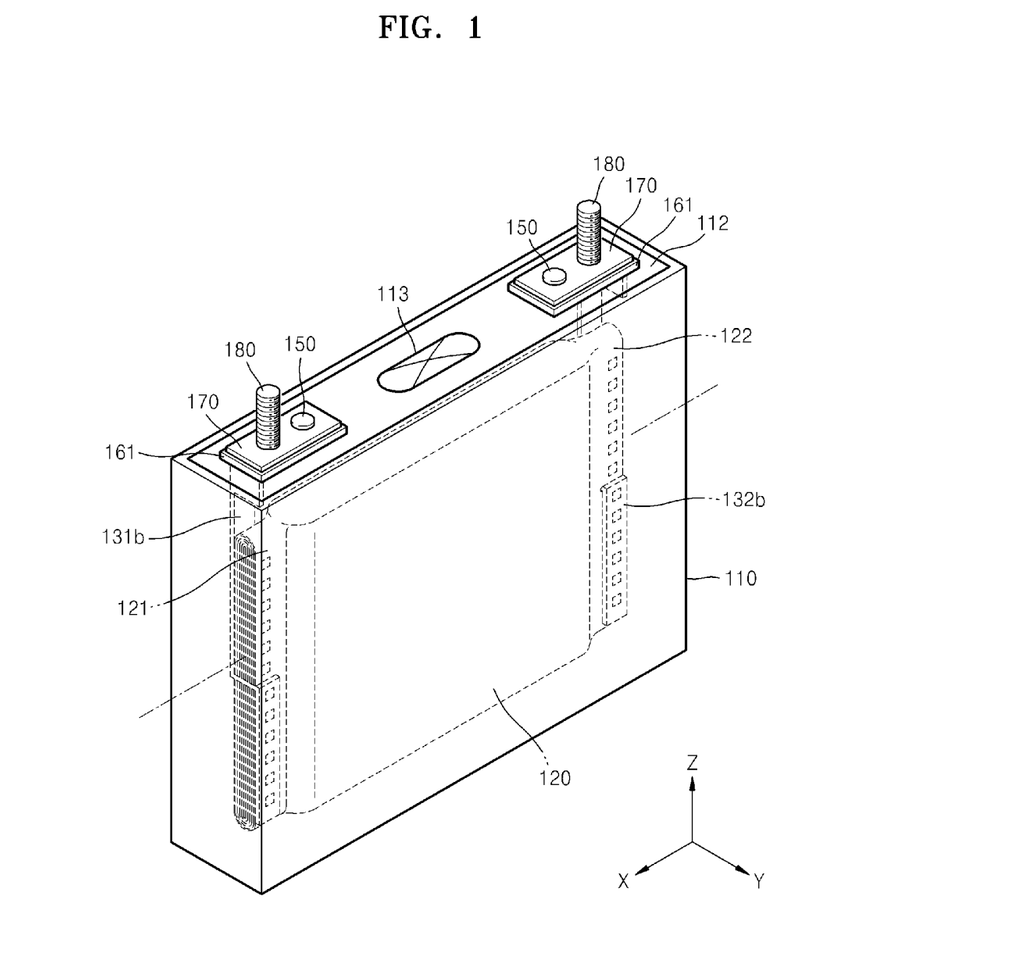
FIG. 1 is a schematic perspective view of a secondary battery according to an embodiment of the present invention.
Figure 2:
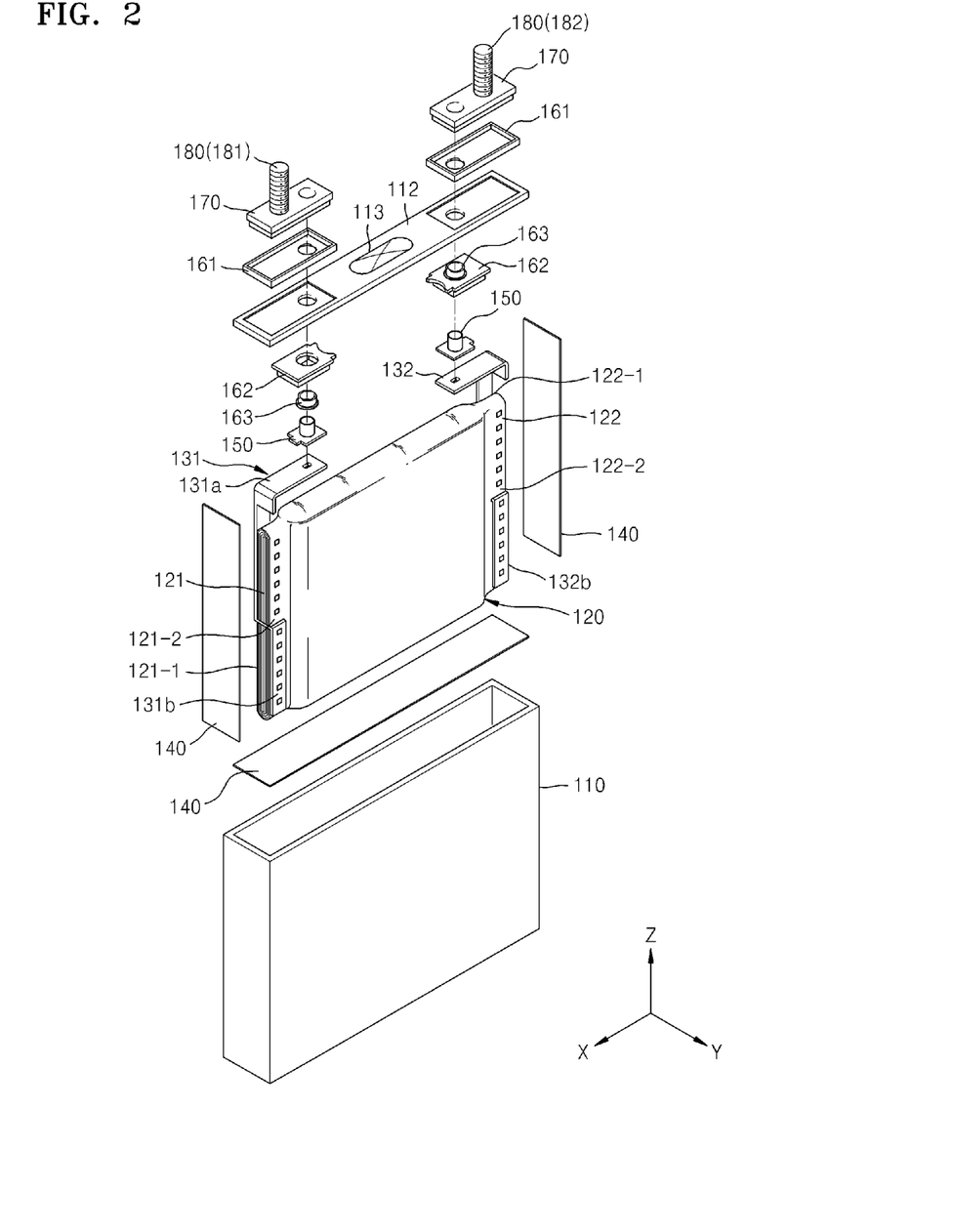
FIG. 2 is an exploded perspective view of the secondary battery of FIG. 1.

FIG. 1 is a schematic perspective view of a secondary battery according to an embodiment of the present invention. FIG. 2 is an exploded perspective view of the secondary battery of FIG. 1.

Referring to FIGS. 1 and 2, in the secondary battery, an electrode assembly 120 and an electrolyte are housed by a can 110 having an opening, and the opening of the can 110 is sealed by a cap plate 112. The electrode assembly 120 may be electrically connected to an external terminal 180 through current collectors 131 and 132 located on both sides of the electrode assembly 120.

The can 110 may include a conductive metallic material, such as aluminum, an aluminum alloy, or nickel-coated steel. The can 110 may have a hexagonal structure having an opening that allows the electrode assembly 120 to be housed therein. However, the structure of the can 110 is not limited thereto.

The electrode assembly 120 may include a first electrode plate a second electrode plate, and a separator interposed between the first electrode plate and the second electrode plate, and may be wound in an elliptic-cylindrical shape having a flat surface and a curved surface. In this regard, the winding direction may be an x axis direction illustrated in FIG. 1.

The electrode assembly 120 may include first and second uncoated portions 121 and 122 at opposite ends thereof. The first uncoated portion 121 may be included in the first electrode plate, and may have, for example, a positive polarity, and the second uncoated portion 122 may be included in the second electrode plate and may have, for example, a negative polarity. Alternatively, the first uncoated portion 121 may have a negative polarity and the second uncoated portion 122 may have a positive polarity.

The electrode assembly 120 may be housed by the can 110 in such a manner that the first and second uncoated portions 121 and 122 are located on opposite sides of the can 110. In this regard, a retainer 140 may be located corresponding to an inner surface of the can 110 to prevent the electrode assembly 120 from moving inside the can 110, The electrode assembly 120 and an electrolyte are housed by the can 110, and the opening of the can 110 may be closed by the cap plate 112. Like the can 110, the cap plate 112 may be formed of a conductive metallic material. The cap plate 112 may have a vent 113. The vent 113 may be integrally formed with the cap plate 112, and may have a thickness that is smaller than that of the cap plate 112 so that when an inner pressure of the can 110 is equal to or greater than a set pressure, the vent 113 may be ruptured.

At least one of the first and second uncoated portions 121 and 122 may have a groove, and according to the present embodiment, each of the first and second uncoated portions 121 and 122 has a groove.

First and second current collectors 131 and 132 may each include a conductive metallic material. For example, the first current collector 131 may include aluminum or an aluminum alloy, and the second current collector 132 may include copper or a copper alloy.

The first and second current collectors 131 and 132 may be respectively connected to the first and second uncoated portions 121 and 122 and may respectively include first and second lead tabs 131b and 132b. For example, the first and second current collectors 131 and 132 may be electrically connected to the electrode assembly 120 by connecting the first and second lead tabs 131b and 132b of the first and second current collectors 131 and 132 to the first and second uncoated portions 121 and 122.

The first lead tab 131b may be bent passing through the groove formed in the first uncoated portion 121 in such a manner that a portion of the first lead tab 131b contacts a side surface 121-1 (hereinafter referred to as a first surface) of the first uncoated portion 121 and another portion thereof contacts another side surface 121-2 (hereinafter referred to as a second surface) of the first uncoated portion 121. As described above, because the electrode assembly 120 is wound in the elliptic-cylindrical shape having a flat surface and a curved surface, the first uncoated portion 121 may also have a flat surface and a curved surface. In this regard, the first surface 121-1 and the second surface 121-2 of the first uncoated portion 121 are disposed on the flat surface. That is, the first surface 121-1 and second surface 121-2 of the first uncoated portion 121 may be flatly formed overall.

The portion of the first lead tab 131b is welded to the first surface 121-1 of the first uncoated portion 121, and another portion of the first lead tab 131b is welded to the second surface 121-2 of the second uncoated portion 122, so that the first lead tab 131b is electrically connected to the electrode assembly 120.

Likewise, the second lead tab 132b may be bent passing through the groove formed in the second uncoated portion 122 in such a manner that a portion of the second lead tab 132b contacts a side surface 122-1 (hereinafter referred to as a third surface) of the second uncoated portion 122 and another portion of the second lead tab 132b contacts another side surface 122-2 (hereinafter referred to as a fourth surface) of the second uncoated portion 122. The portion of the second lead tab 132b may be welded to the third surface 122-1 of the second uncoated portion 122, and another portion of the second lead tab 132b may be welded to the fourth surface 122-2 of the second uncoated portion 122. Thus, the first and the second current collectors 131 and 132 may each be electrically connected to the electrode assembly 120.

The first and second current collectors 131 and 132 may be electrically connected to the electrode assembly 120 and the first and second external terminals 181 and 182. The first current collector 131 may be connected to the electrode assembly 120 by, as described above, welding the first lead tab 131b to the first uncoated portion 121, and the first current collector 131 may be connected to the first external terminal 181 through a rivet terminal 150 and a conductive plate 170. The second current collector 132 may be connected to the second external terminal 182 through the rivet terminal 150 and the conductive plate 170.

For example, an upper portion 131a of the first current collector 131 is bent toward the bent surface of the electrode assembly 120, that is, an upper portion surface thereof, and the curved upper portion 131a of the first current collector 131 is connected to a lower portion of the rivet terminal 150. An upper portion of the rivet terminal 150 may be inserted into a hole of the conductive plate 170 through the cap plate 112.

Since the rivet terminal 150 is formed of a conductive metallic material, such as aluminum or an aluminum alloy, the first current collector 131, the rivet terminal 150, the conductive plate 170, and the first external terminal 181 formed on the conductive plate 170 may form a current path.

In this regard, a sealing gasket 163 may be disposed between the rivet terminal 150 and the cap plate 112 to prevent leakage of an electrolyte.

An upper insulator 161 and a lower insulator 162 are respectively disposed on a lower surface and the upper surface of the cap plate 112 to prevent the first current collector 131 and the conductive plate 170 from being electrically connected to the cap plate 112. In the present embodiment, the sealing gasket 163 is formed as an independent entity separated from the lower insulator 162. In some embodiments, however, the sealing gasket 163 may be integrally formed with the lower insulator 162.

As described above, the second current collector 132 that is electrically connected to the electrode assembly 120 by welding may be electrically connected to the second external terminal 182 through the rivet terminal 150 and the conductive plate 170.

In the present embodiment, the first and second external terminals 181 and 182 each have a bolt shape. However, the present invention is not limited thereto. For example, the first and second external terminals 181 and 182 may have a rivet shape.

As described above, the first and second lead tabs 131b and 132b are bent passing through the grooves g formed in the first and second uncoated portions 121 and 122 of the electrode assembly 120 that is winded about a winding axis, and are respectively welded to the first and second uncoated portions 121 and 122. Accordingly, the electrical connection between the first and second current collectors 131 and 132 and the electrode assembly 120 may be stably maintained. Hereinafter, a detailed structure of the electrode assembly 120 and the current collectors 131 and 132 is described with reference to FIGS. 3 to 5B.

Figure 3:
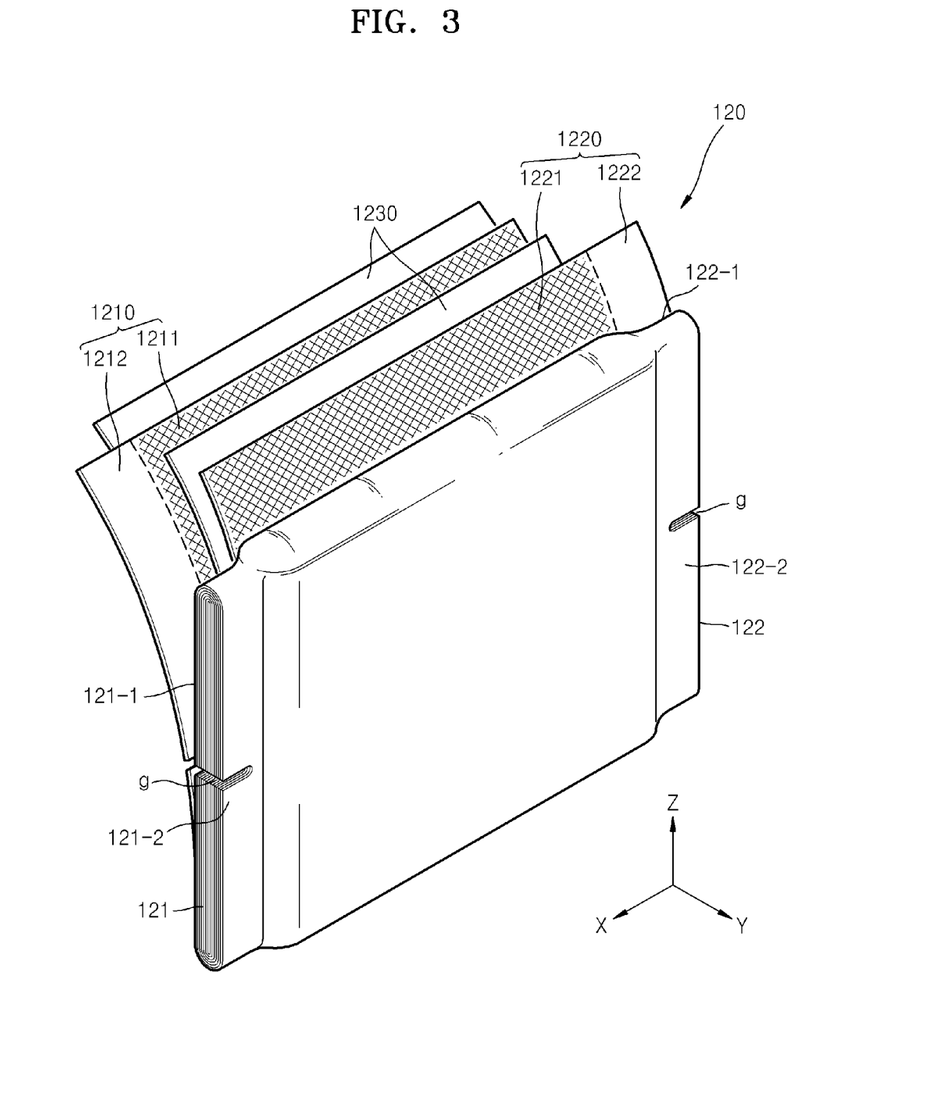
FIG. 3 is a schematic perspective view of an electrode assembly illustrated in FIG. 1.
Figure 4:
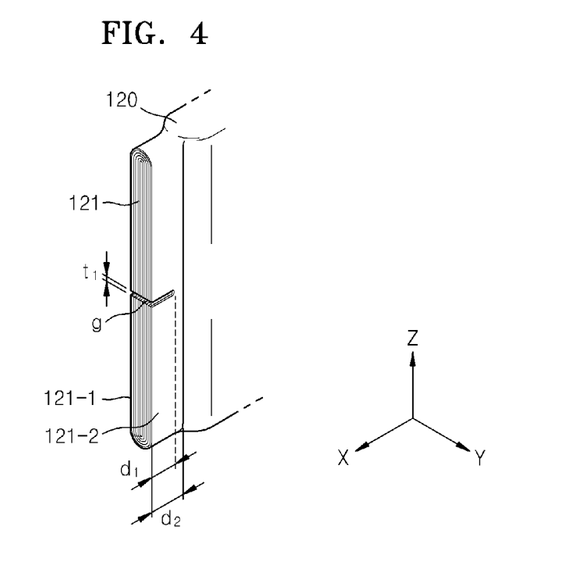
FIG. 4 is a perspective view illustrating a first uncoated portion of the electrode assembly illustrated in FIG. 1.

FIG. 3 is a schematic perspective view of the electrode assembly 120 illustrated in FIG. 1. FIG. 4 is a perspective view illustrating the first uncoated portion 121 of the electrode assembly 120 illustrated in FIG. 1.

Referring to FIG. 3, the electrode assembly 120 may be wound in a state in which a separator 1230 is interposed between a first electrode plate 1210 and a second electrode plate 1220. In this regard, a first uncoated portion 1212 of the first electrode plate 1210 and a second uncoated portion 1222 of the second electrode plate 1220 are disposed in opposite directions.

The first electrode plate 1210 may include a first active material portion 1211 on which a first active material is coated, and the first uncoated portion 1212 which is located on a side of the first active material portion 1211 and on which the first active material is not coated. For example, a positive active material is coated on a portion of opposite sides of a metal plate formed of, for example, aluminum, to form the first active material portion 1211, and the remaining portion of the metal plate is used as the first uncoated portion 1212.

The second electrode plate 1220 may include a second active material portion 1221 on which a second active material is coated, and the second uncoated portion 1222 which is located on a side of the second active material portion 1221 and on which the second active material is not coated. For example, a negative active material is coated on a portion of opposite sides of a metal plate formed of, for example, copper, to form the second active material portion 1221, and the remaining portion of the metal plate is used as the second uncoated portion 1222.

The first and second electrode plates 1210 and 1220 are wound about a winding axis in a jelly-roll shape in a state in which the separator 1230 is interposed between the first and second active material portions 1211 and 1221, and then the resultant structure is pressed to form the electrode assembly 120 having an elliptic-cylindrical shape having a flat surface and a curved surface.

In this regard, the first uncoated portion 1212 of the first electrode plate 1210 is wound to overlap each other to form the first uncoated portion 121 of the electrode assembly 120, and the second uncoated portion 1222 of the second electrode plate 1220 is wound to overlap each other to form the second uncoated portion 122 of the electrode assembly 120.

Each of the first and second uncoated portions 121 and 122 may have a groove g. For example, the groove g of the first uncoated portion 121 may extend in a direction from the first surface 121-1 of the first uncoated portion 121 to the second surface 121-2 of the first uncoated portion 121, that is, in a y axis direction, and the groove g of the second uncoated portion 122 may extend in a direction from the third surface 122-1 of the second uncoated portion 122 to the fourth surface 122-2 of the second uncoated portion 122.

Referring to FIGS. 3 and 4, the groove g extends in the direction from the first surface 121-1 of the first uncoated portion 121 to the second surface 121-2 of the first uncoated portion 121. Since the electrode assembly 120 is wound in the elliptic-cylindrical shape having a flat surface and a curved surface, the first uncoated portion 121 also has a flat surface and a curved surface, and in this regard, the first surface 121-1 and second surface 121-2 of the first uncoated portion 121 are placed on the flat surface. The groove g may extend in a direction (y direction) that is roughly perpendicular to the first surface 121-1 and the second surface 121-2.

A depth $d_1$ of the groove g may be equal to or smaller than a width $d_2$ of the first uncoated portion 121, and may be equal to or greater than a width $d_3$ of the first lead tab 131b which is described below with reference to FIGS. 5A and 5B. A thickness $t_1$ of the groove g may be substantially the same as a thickness $t_2$ of the first lead tab 131b.

Figure 5A:
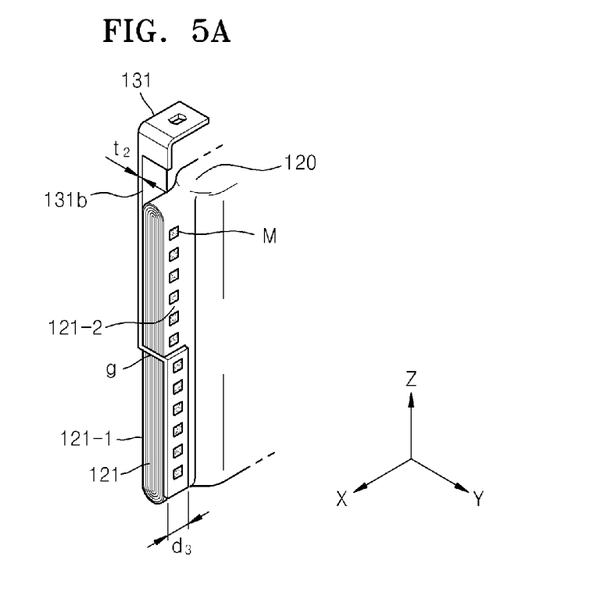
FIG. 5A is a perspective view illustrating an example of connection of the first uncoated portion and a first lead tab of the electrode assembly illustrated in FIG. 1.

FIG. 5A is a perspective view illustrating an example of connection of the first uncoated portion 121 and the first lead tab 131b of the electrode assembly 120 illustrated in FIG. 1. FIG. 5B is a side view of the structure of FIG. 5A.

Figure 5B:
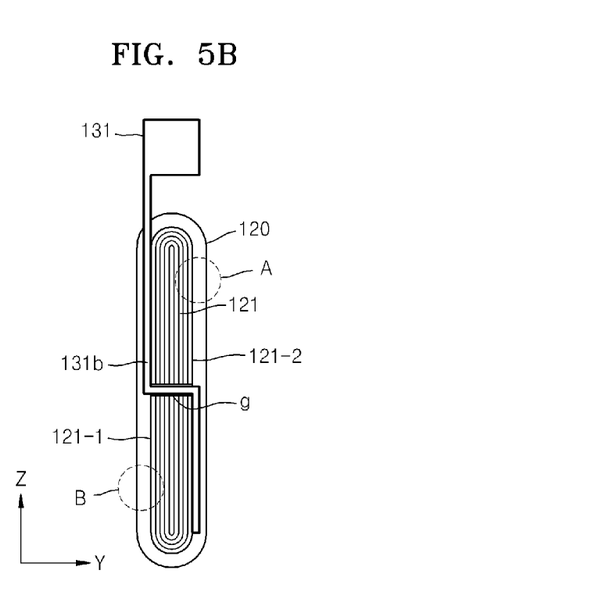
FIG. 5B is a side view of the structure of FIG. 5A.

Referring to FIGS. 5A and 5B, the first lead tab 131b passes through the groove g, such that a portion of the first lead tab 131b contacts at least a portion of the first surface 121-1 of the first uncoated portion 121 and another portion of the first lead tab 131b contacts at least a portion of the second surface 121-2 of the first uncoated portion 121. The first lead tab 131b may be bent anywhere between an end of the groove g and the first surface 121-1 of the first uncoated portion 121, and may be bent anywhere between another end of the groove g and the second surface 121-2 of the first uncoated portion 121.

The first lead tab 131b which is bent twice to pass through the groove g is welded to the first uncoated portion 121. For example, welding may be performed in a state in which a portion of the first lead tab 131b contacts a portion of the first surface 121-1 of the first uncoated portion 121 and another portion of the first lead tab 131b contacts a portion of the second surface 121-2 of the first uncoated portion 121. Due to the welding, the first lead tab 131b is electrically connected to the first uncoated portion 121, and the first lead tab 131b and the first uncoated portion 121 have welding remains M as illustrated in FIG. 5A.

To manufacture a high-output and high-capacitor secondary battery, the electrode assembly 120 is wound about a winding axis a plurality of times. Accordingly, uncoated portions overlap each other and active material portions overlap each other, and the thickness of the electrode assembly 120 increases according to the number of times of winding. The first and second uncoated portions 121 and 122 of the electrode assembly 120 have relatively small thicknesses compared to the first and second active material portions 1211 and 1221. However, to manufacture a high-output and high-capacitor secondary battery, the winding repetition number needs to be increased, and in this case, the thicknesses of the first and second uncoated portions 121 and 122 are increased. Thus, it may be difficult to weld the first and second uncoated portions 121 and 122 to the first and second lead tabs 131b and 132b.

As a comparative example of the present invention, for example, when welding is performed in a state in which the first lead tab 131b is disposed on only one side of the first uncoated portion 121, that is, only on the first surface 121-1, the welding result may be as follows: the bonding power between the first surface 121-1 of the first uncoated portion 121, which directly contacts the first lead tab 131b, and the first lead tab 131b is relatively strong, however, the bonding power between the second surface 121-2 of the first uncoated portion 121 and the first lead tab 131b is relatively weak, and this phenomenon may more frequently occur as the winding repetition number of the electrode assembly 120 increases. When a bonding power between the second surface 121-2 of the first uncoated portion 121 and the first lead tab 131b is decreased, the current generated by the electrode assembly 120 flows through only a portion of the first uncoated portion 121 which substantially contacts the first lead tab 131b, and thus, an inner resistance may be increased. Accordingly, the total power output of a formed secondary battery may be reduced.

However, according to an embodiment of the present invention, the welding of the first and second lead tab and the first and second uncoated portions 121 and 122 is stably maintained, and an increase in the inner resistance may be minimized. In detail, because welding is performed in a state in which a portion of the first lead tab 131b contacts the first surface 121-1 of the first uncoated portion 121 and another portion of the second lead tab 132b contacts the second surface 121-2 of the first uncoated portion 121, the welding may be stably maintained.

Also, even when as illustrated in FIG. 5B, the bonding power is reduced and a gap is formed therebetween in a region A and a region B, because a portion of the first lead tab 131b is welded to the first surface 121-1 of the first uncoated portion 121 and another portion of the e first lead tab 131b is welded to the second surface 121-2 of the first uncoated portion 121, an increase in the inner resistance may be minimized.

With reference to FIGS. 4 to 5B, the connection between the first uncoated portion 121 and the first lead tab 131b has been described. The same description may also be referred to for understanding the connection between the second uncoated portion 122 and the second lead tab 132b.

Figure 6A:
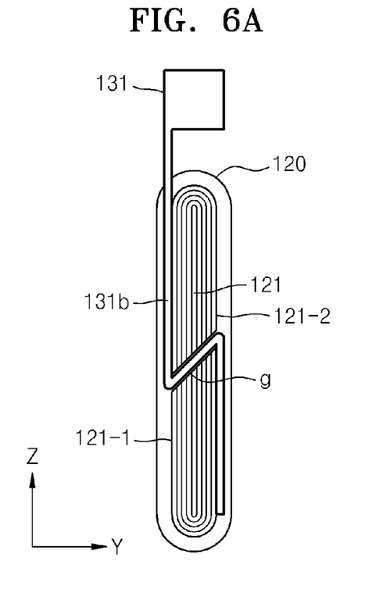
FIGS. 6A and 6B are schematic side views illustrating another example of connection of a first uncoated portion and a first lead tab of an electrode assembly.
Figure 6B:
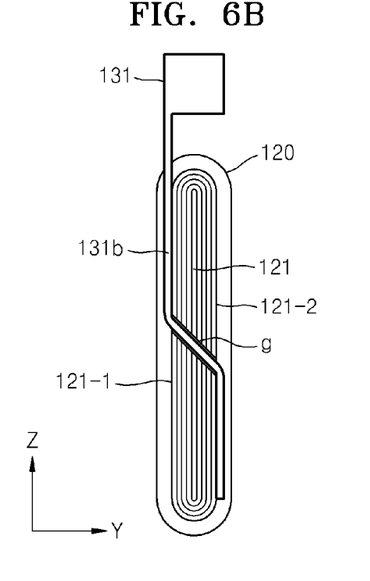

FIGS. 6A and 6B are schematic side views illustrating another example of the connection of the first uncoated portion 121 and the first lead tab 131b of the electrode assembly 120.

The groove g of the first uncoated portion 121 which has been described with reference to FIGS. 5A and 5B extends in a shorter radius direction of the first uncoated portion 121, that is, in a y axis direction. Accordingly, the first lead tab 131b passing through the groove g is bent twice at an angle of about 90 degrees.

According to another embodiment of the present invention, with reference to FIGS. 6A and 6B, the groove g of the first uncoated portion 121 may be inclined with respect to the y axis direction.

For example, the first lead tab 131b may be bent at an angle smaller (see FIG. 6A) or greater (see FIG. 6B) than 90 degrees between an end of the groove g and the first surface 121-1 of the first lead tab 131b and between another end of the groove g and the second surface 121-2 of the first lead tab 131b.

Figure 7:
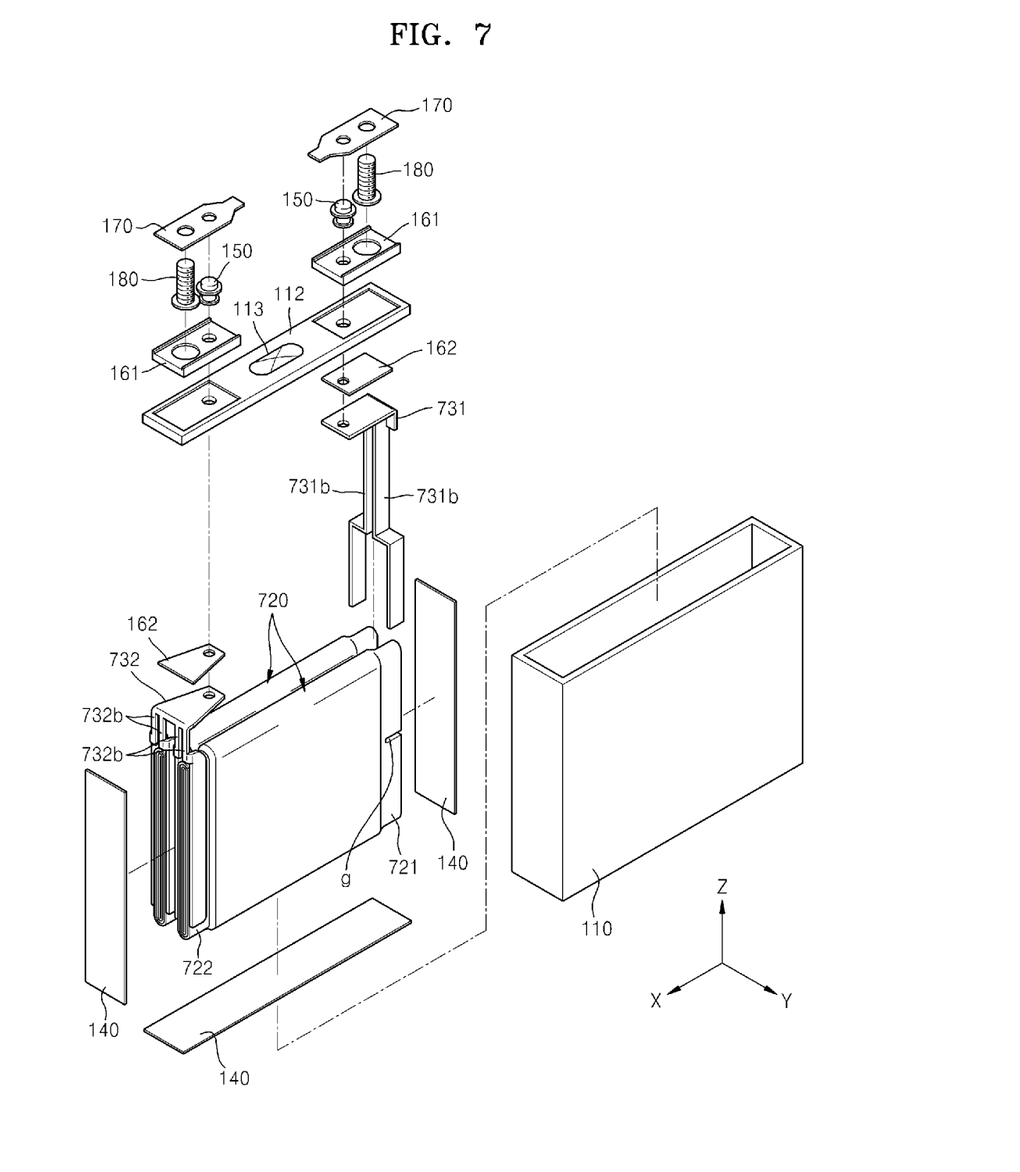
FIG. 7 is an exploded perspective view of a secondary battery according to another embodiment of the present invention.

FIG. 7 is an exploded perspective view of a secondary battery according to another embodiment of the present invention.

Referring to FIG. 7, regarding the secondary battery according to the present embodiment, the can 110 houses a plurality of electrode assemblies 720 and an electrolyte, and the cap plate 112 seals the opening of the can 110. The difference between the secondary battery according to the present embodiment and the secondary battery described with reference to FIGS. 1 and 2 is described below.

The secondary battery may include two or more electrode assemblies housed by a can to increase the output thereof. The electrode assemblies 720 may be electrically connected to each other in parallel through a first current collector 731 and a second current collector 732, and may be electrically connected to the external terminal 180 through the first current collector 731 and the second current collector 732. In this regard, the first current collector 731 and the second current collector 732 may have different shapes.

For example, the first current collector 731 may include two first lead tabs 731b. The first lead tabs 731b may be electrically connected to first uncoated portions 721 by welding. The structure of the first current collector 731 and the electric connection of the first current collector 731 with the electrode assemblies 720 are described below with reference to FIGS. 8 and 9.

The second current collector 732 may include four second lead tabs 732b. Welding is performed in a state in which two of the four second lead tabs 732b contact both side surfaces of a second uncoated portion 722 of any one of the electrode assemblies 720 and the other two second lead tabs 732b contact both side surfaces of a second uncoated portion 722 of the other electrode assembly 720.

Figure 8A:
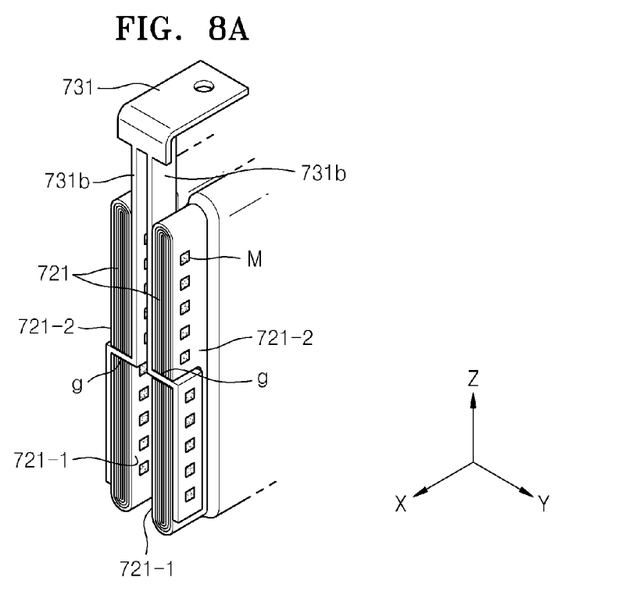
FIG. 8A is a perspective view illustrating an example of connection of first uncoated portions and first lead tabs of a plurality of electrode assemblies illustrated in FIG. 7.
Figure 8B:
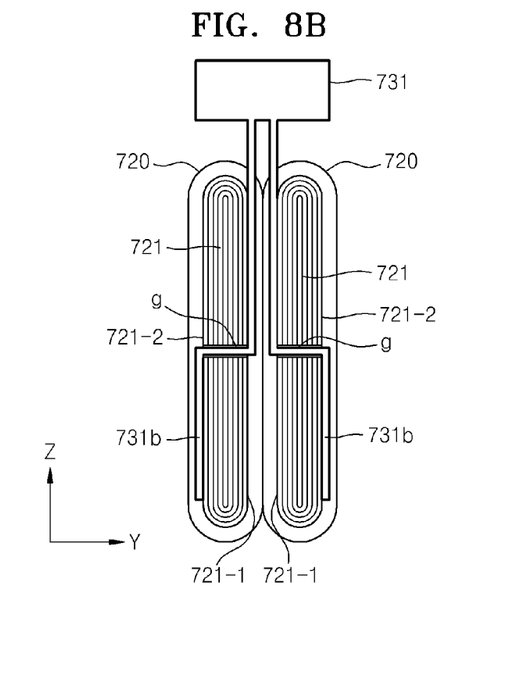
FIG. 8B is a side view of the structure of FIG. 8A.
Figure 9A:
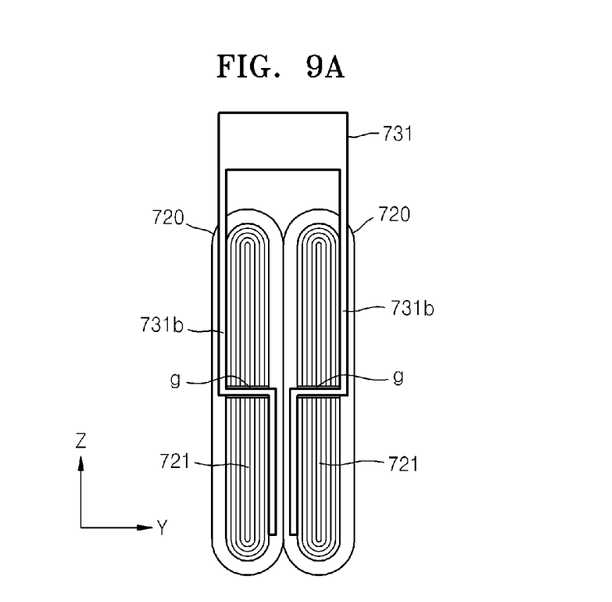
FIGS. 9A, 9B and 9C are schematic side views illustrating another example of the connection of first uncoated portions and first lead tabs of a plurality of electrode assemblies.
Figure 9B:
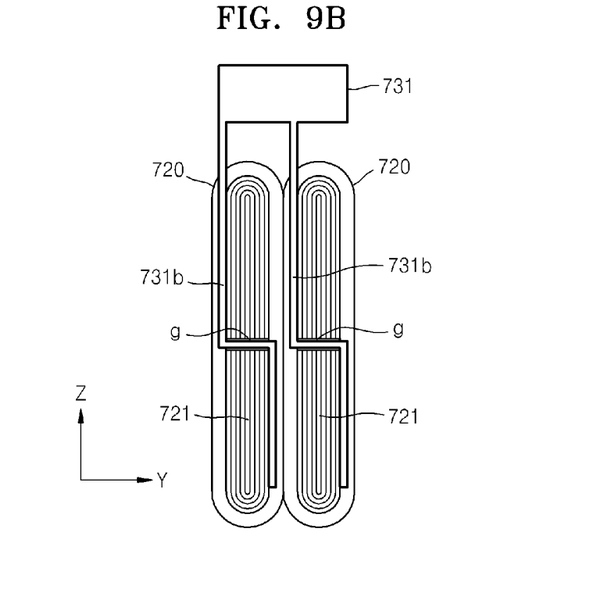

FIG. 8A is a perspective view illustrating an example of the connection of the first uncoated portions 721 and the first lead tabs 731b of the electrode assemblies 720 illustrated in FIG. 7. FIG. 8B is a side view of the structure of FIG. 8A. FIGS. 9A and 9B are schematic side views illustrating another example of the connection of the first uncoated portions 721 and the first lead tabs 731b of the electrode assemblies 720.

Referring to FIGS. 8A and 8B, each of the first lead tabs 731b passes through the groove g, such that a portion of the first lead tabs 731b contacts at least a portion of the first surface 721-1 of each of the first uncoated portions 721, and another portion of the first lead tabs 731b contacts at least a portion of the second surface 721-2 of each of the first uncoated portions 721. Each of the first lead tabs 731b may be bent anywhere between an end of the groove g and the first surface 721-1 of each of the first uncoated portions 721, and may be bent anywhere between another end of the groove g and the second surface 721-2 of each of the first uncoated portions 721.

The first lead tabs 731b which are bent twice through the grooves g are welded to the first uncoated portions 721, and due to the welding, the first lead tabs 731b are electrically connected to the first uncoated portions 721, and the first lead tabs 731b and the first uncoated portions 721 have welding remains M as illustrated in FIG. 8A.

Figure 9C:
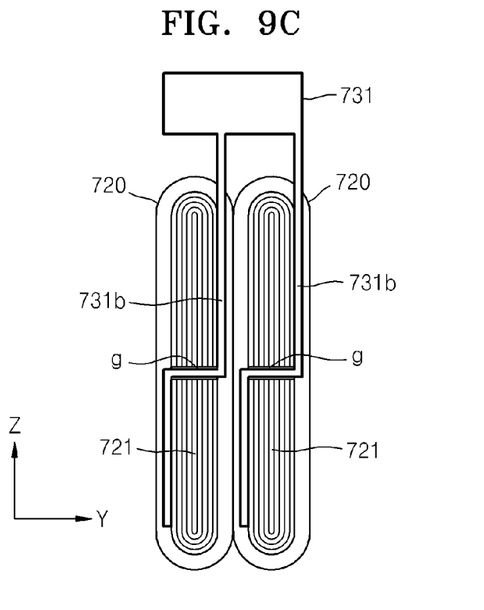

The first lead tabs 731b may be arranged as illustrated in FIG. 8B, or may be arranged to be symmetric about a z axis as illustrated in FIG. 9A. According to another embodiment of the present invention, the first lead tabs 731b may be arranged to be bent in the same direction as illustrated in FIGS. 9B and 9C.

A secondary battery including an electrode assembly that is wound in an elliptic cylindrical shape has been described. However, according to another embodiment of the present invention, an electrode assembly may have a stack shape, and in this case, the stack-shape electrode assembly may have an uncoated portion having a groove, thereby allowing a lead tab of a current collector to be bent and welded to the uncoated portion of the electrode assembly.

As described above, according to the one or more of the above embodiments of the present invention, a lead tab has a bent structure that allows the lead tab to stably contact both surfaces of the uncoated portion to form a current path, and thus, welding between a current collector and an electrode assembly may be stably maintained, and an increase in an inner resistance of a formed secondary battery is minimized so that the secondary battery may provide a sufficient amount of electric power to an electronic device or a transportation vehicle.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. A secondary battery comprising:
an electrode assembly comprising a first electrode plate that comprises an uncoated portion formed along an end of the first electrode plate, a second electrode plate that comprises an uncoated portion formed along an end of the second electrode plate, and a separator that is interposed between the first electrode plate and the second electrode plate, wherein the first and second electrode plates and the separator are wound so that the uncoated portion of the first electrode plate and the uncoated portion of the second electrode plate are arranged in opposite directions;

a groove formed in at least one of the uncoated portions of the first and second electrode plates, wherein the at least one of the uncoated portions is a first uncoated portion; and a current collector comprising a lead tab that is bent passing the groove so that a first portion of the lead tab contacts a first side surface of the first uncoated portion and a second portion of the lead tab contacts a second side surface of the first uncoated portion wherein the electrode assembly has a shape having two parallel outer flat surfaces and two outer curved surfaces interconnecting the parallel outer flat surfaces, and the first side surface and the second side surface of the first uncoated portion are respectively located on the outer flat surfaces and wherein the groove extends between the first and second side surfaces.

2. The secondary battery of claim 1, wherein the groove of the first uncoated portion extends from the first side surface of the first uncoated portion which contacts the lead tab to the second side surface of the first uncoated portion which contacts the lead tab.

3. The secondary battery of claim 1, wherein the electrode assembly has an elliptic-cylindrical shape having a flat surface and a curved surface, and the first side surface and the second side surface of the first uncoated portion are located on the flat surface, and the groove is perpendicular to the first side surface and the second side surface of the first uncoated portion.

4. The secondary battery of claim 1, wherein the first portion of the lead tab and the second portion of the lead tab contact the first and second side surfaces of the first uncoated portion by welding.

5. The secondary battery of claim 1, wherein the lead tab is bent between the first side surface of the first uncoated portion and the groove and is further bent between the second side surface of the first uncoated portion and the groove, the lead tab comprises the first portion, the second portion, and a third portion positioned between the first and second portion and coupled with the first and second portions, and wherein the first portion of the lead tab is positioned over a portion of the first side surface less than the whole first side surface extending from a first end of the lead tab in a first direction and the third portion of the lead tab is positioned in the groove to extend in a second direction that intersects the first direction and the second portion of the lead tab is positioned on a portion of the second side surface less than the whole second side surface so as to extend on the second side surface in the first direction to a second end of the lead tab.

6. The secondary battery of claim 1, wherein the lead tab is bent perpendicular to the first side surface of the first uncoated portion which contacts the lead tab.

7. The secondary battery of claim 1, wherein the lead tab is bent at an angle that is greater than 90 degrees to the first surface of the first uncoated portion which contacts the lead tab.

8. A secondary battery comprising:

a first electrode plate that comprises a first active material portion on which a first active material is coated and a first uncoated portion formed on a side of the first active material portion, and that is wound about an axis extending across the first active material portion and the first uncoated portion; and a first current collector that is electrically connected to the first uncoated portion, wherein the first uncoated portion has a groove, and the first current collector comprises a first lead tab that is connected to the first uncoated portion, and the first lead tab is bent passing through the groove in such a way that a first portion of the first lead tab contacts a first side surface of the first uncoated portion and a second portion of the first lead tab contacts a second side surface of the first uncoated portion wherein the electrode assembly has a shape having first and second long-side surfaces which are parallel surfaces and first and second short-side surfaces interconnecting the first and second long-side surfaces, and the first side surface and the second side surface of the first uncoated portion are respectively located on the first and second long-side surfaces and wherein the groove extends between the first and second side surfaces.

9. The secondary battery of claim 8, wherein the groove extends from the first side surface of the first uncoated portion to the second side surface of the first uncoated portion.

10. The secondary battery of claim 8, wherein a depth of the groove is equal to or smaller than a width of the uncoated portion.

11. The secondary battery of claim 8, wherein a thickness of the groove is equal to a thickness of the first lead tab.

12. The secondary battery of claim 8, wherein the first electrode plate is wound to be in an elliptic-cylindrical form having a flat surface and a curved surface.

13. The secondary battery of claim 12, wherein the first side surface and the second side surface of the first uncoated portion are located on the flat surface.

14. The secondary battery of claim 8, further comprising:

a second electrode plate comprising a second active material portion on which a second active material is coated and a second uncoated portion formed on a side of the second active material portion, and that is wound about the axis, and a second current collector that is electrically connected to the second electrode plate and comprises a second lead tab, wherein the second uncoated portion is disposed in a direction opposite to where the first uncoated portion is located.

15. A secondary battery comprising:

a first electrode assembly comprising a positive electrode plate that comprises an uncoated portion formed along an end of the positive electrode plate, a negative electrode plate that comprises an uncoated portion formed along an end of the negative electrode plate, and a separator that is interposed between the positive electrode plate and the negative electrode plate, wherein the positive and negative electrode plates and the separator are wound so that the uncoated portion of the positive electrode plate and the uncoated portion of the negative electrode plate are arranged in opposite directions;

a can for housing the first electrode assembly;

a cap plate for covering an opening of the can; and a first current collector comprising a first lead tab that is electrically connected to the first electrode assembly, wherein at least one of the uncoated portion of the positive electrode plate and the uncoated portion of the negative electrode plate has a groove, and the first lead tab is bent passing through the groove in such a way that a first portion of the first lead tab contacts a first side surface of the first uncoated portion and a second portion of the first lead tab contacts a second side surface of the first uncoated portion wherein the electrode assembly has a shape having two parallel outer flat surfaces, and the first side surface and the second side surface of the first uncoated portion are respectively located on the outer flat surfaces and wherein the groove extends between the first and second side surfaces.

16. The secondary battery of claim 15, wherein the groove extends from the first side surface of the first uncoated portion to the second side surface of the first uncoated portion, in a direction perpendicular to the first side surface and the second side surface of the first uncoated portion.

17. The secondary battery of claim 15, wherein a depth of the groove is equal to or greater than a width of the first lead tab.

18. The secondary battery of claim 17, wherein a depth of the groove is equal to or smaller than a width of the first uncoated portion.

19. The secondary battery of claim 15, wherein the first lead tab is bent between the first side surface of the first uncoated portion and the groove and is further bent between the second side surface of the first uncoated portion and the groove, and
wherein the first lead tab is positioned over a portion of the first side surface less than the whole first side surface extending from a first end of the lead tab in a first direction and then is positioned in the groove to extend in a second direction that intersects the first direction and then is positioned on the second side surface less than the whole second side surface so as to extends on the second side surface in the first direction to a second end of the lead tab.

20. The secondary battery of claim 15, further comprising:
a second electrode assembly comprising a positive electrode plate that comprises an uncoated portion formed along an end of the positive electrode plate, a negative electrode plate that comprises an uncoated portion formed along an end of the negative electrode plate, and a separator that is interposed between the positive electrode plate and the negative electrode plate, wherein the positive and negative electrode plates and the separator are wound in such a way that the uncoated portion of the positive electrode plate and the uncoated portion of the negative electrode plate are arranged in opposite directions,
wherein the first current collector further comprises a second lead tab that is electrically connected to the second electrode assembly.

21. The secondary battery of claim 15, further comprising:
a second current collector that is electrically connected to the remaining one of the uncoated portions of the first and second electrode plates, which is a second uncoated portion,
wherein the second current collector comprises at least one pair of lead tabs that contact a first side surface of the second uncoated portion and a second side surface of the second uncoated portion.

22. The secondary battery of claim 21, wherein the lead tab is bent at an angle that is greater than 90 degrees to the first surface of the first uncoated portion which contacts the lead tab.

23. The secondary battery of claim 8, the lead tab comprises the first portion, the second portion, and a third portion positioned between the first and second portion and coupled with the first and second portions, and
wherein the first portion of the lead tab is positioned over a portion of the first side surface less than the whole first side surface extending from a first end of the lead tab in a first direction and the third portion of the lead tab is positioned in the groove to extend in a second direction that intersects the first direction and the second portion of the lead tab is positioned on a portion of the second side surface less than the whole second side surface so as to extends on the second side surface in the first direction to a second end of the lead tab.

* * * * *